United States Patent
Omikawa

(10) Patent No.: US 12,091,005 B2
(45) Date of Patent: Sep. 17, 2024

(54) LANE DEPARTURE CONTROL APPARATUS FOR VEHICLE

(71) Applicant: SUBARU CORPORATION, Tokyo (JP)

(72) Inventor: Takashi Omikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 457 days.

(21) Appl. No.: 17/493,942

(22) Filed: Oct. 5, 2021

(65) Prior Publication Data

US 2022/0105932 A1 Apr. 7, 2022

(30) Foreign Application Priority Data

Oct. 5, 2020 (JP) ................. 2020-168706

(51) Int. Cl.
*B60W 30/12* (2020.01)
*B62D 15/02* (2006.01)

(52) U.S. Cl.
CPC .......... *B60W 30/12* (2013.01); *B62D 15/021* (2013.01); *B62D 15/025* (2013.01); *B60W 2520/125* (2013.01); *B60W 2552/30* (2020.02); *B60W 2552/53* (2020.02); *B60W 2554/4046* (2020.02)

(58) Field of Classification Search
CPC .......... B60W 30/12; B60W 2520/125; B60W 2552/30; B62D 15/021; B62D 15/025
See application file for complete search history.

(56) References Cited

U.S. PATENT DOCUMENTS

2014/0257640 A1* 9/2014 Mitsumoto ......... B60W 40/101
    701/41
2018/0178839 A1* 6/2018 Ide ....................... B62D 15/029

FOREIGN PATENT DOCUMENTS

EP        2325069 A1 * 5/2011 ............ B60W 30/12
JP        2013-91494 A    5/2013

* cited by examiner

*Primary Examiner* — Anshul Sood
(74) *Attorney, Agent, or Firm* — TROUTMAN PEPPER HAMILTON SANDERS LLP

(57) ABSTRACT

A lane departure control apparatus for a vehicle includes a lane departure control calculator, a lane information acquiring unit, and a steering angle detector. The lane departure control calculator is configured to determine whether the vehicle is to depart from a current lane in accordance with a preset lane departure control pattern. The lane departure control calculator includes an estimated-lateral-acceleration calculator, an actual-lateral-acceleration calculator, a lane-based-lateral-acceleration calculator, a storage, and a control pattern generator. The control pattern generator is configured to compare a lane-based lateral acceleration calculated by the lane-based-lateral-acceleration calculator and a limit stored in the storage and to generate a new lane departure control pattern in a case where the lane-based lateral acceleration is over the limit. The control pattern generator generates the new lane departure control pattern by correcting the lane-based lateral acceleration in accordance with an excess of the lane-based lateral acceleration over the limit.

9 Claims, 8 Drawing Sheets

LANE DEPARTURE CONTROL APPARATUS FOR VEHICLE

CROSS-REFERENCE TO RELATED APPLICATION

The present application claims priority from Japanese Patent Application No. 2020-168706 filed on Oct. 5, 2020, the entire contents of which are hereby incorporated by reference.

BACKGROUND

The disclosure relates to a lane departure control apparatus intended for a vehicle. The apparatus is configured to start lane departure control if it is determined that the vehicle may probably depart from the current lane.

Known lane departure control apparatuses of interest each first recognize the current lane in which the vehicle is traveling, through imaging devices such as cameras disposed on the vehicle. If it is determined that the vehicle is traveling in such a direction that the vehicle may probably depart from the current lane, the apparatus controls the steering torque to make the direction of travel parallel to the lane line, whereby the probability that the vehicle may depart from the current lane is reduced.

For example, according to Japanese Unexamined Patent Application Publication (JP-A) No. 2013-91494, if it is determined that the vehicle may probably depart from the current lane, the lateral velocity of the vehicle is first detected. Then, in accordance with the deviation in the lateral position of the vehicle from a target lateral position, a steering effort is set to act in a direction in which the probability of departure from the current lane is reduced. The rate of change in the steering effort increases with the increase in the deviation. The steering torque acting in the direction in which the probability of departure from the current lane is reduced is corrected to increase in accordance with the increase in the lateral velocity, and the steering torque thus corrected is applied to a steering mechanism, whereby the probability of lane departure is reduced.

SUMMARY

An aspect of the disclosure provides a lane departure control apparatus intended to be applied to a vehicle. The lane departure control apparatus includes a lane departure control calculator, a lane information acquiring unit, and a steering angle detector. The lane departure control calculator is configured to determine whether the vehicle is to depart from a current lane in accordance with a preset lane departure control pattern. The lane information acquiring unit is configured to acquire lane information on the current lane. The steering angle detector is configured to detect a steering angle of the vehicle. The lane departure control calculator includes an estimated-lateral-acceleration calculator, an actual-lateral-acceleration calculator, a lane-based-lateral-acceleration calculator, a storage, and a control pattern generator. The estimated-lateral-acceleration calculator is configured to calculate a lane curvature with reference to the lane information acquired by the lane information acquiring unit and to calculate estimated lateral acceleration with reference to the lane curvature. The estimated lateral acceleration is to act on the vehicle. The actual-lateral-acceleration calculator is configured to calculate actual lateral acceleration of the vehicle with reference to the steering angle detected by the steering angle detector. The lane-based-lateral-acceleration calculator is configured to calculate lane-based lateral acceleration with reference to the estimated lateral acceleration calculated by the estimated-lateral-acceleration calculator and the actual lateral acceleration calculated by the actual-lateral-acceleration calculator. The storage is configured to store a limit of the lane-based lateral acceleration calculated by the lane-based-lateral-acceleration calculator. The control pattern generator is configured to compare the lane-based lateral acceleration calculated by the lane-based-lateral-acceleration calculator and the limit stored in the storage and to generate a new lane departure control pattern in a case where the lane-based lateral acceleration is over the limit. The control pattern generator generates the new lane departure control pattern by correcting the lane-based lateral acceleration in accordance with an excess of the lane-based lateral acceleration over the limit.

An aspect of the disclosure provides a lane departure control apparatus to be applied to a vehicle. The lane departure control apparatus includes circuitry, a lane information acquiring unit, and a steering angle detector. The circuitry is configured to determine whether the vehicle is to depart from a current lane in accordance with a preset lane departure control pattern. The lane information acquiring unit is configured to acquire lane information on the current lane. The steering angle detector is configured to detect a steering angle of the vehicle. The circuitry is configured to calculate a lane curvature with reference to the lane information acquired by the lane information acquiring unit and calculate estimated lateral acceleration with reference to the lane curvature. The estimated lateral acceleration is to act on the vehicle. The circuitry is configured to calculate actual lateral acceleration of the vehicle with reference to the steering angle detected by the steering angle detector. The circuitry is configured to calculate lane-based lateral acceleration with reference to the estimated lateral acceleration and the actual lateral acceleration. The circuitry is configured to store a limit of the lane-based lateral acceleration. The circuitry is configured to compare the lane-based lateral acceleration and the limit and generate a new lane departure control pattern in a case where the lane-based lateral acceleration is over the limit. The new lane departure control pattern is generated by correcting the lane-based lateral acceleration in accordance with an excess of the lane-based lateral acceleration over the limit.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
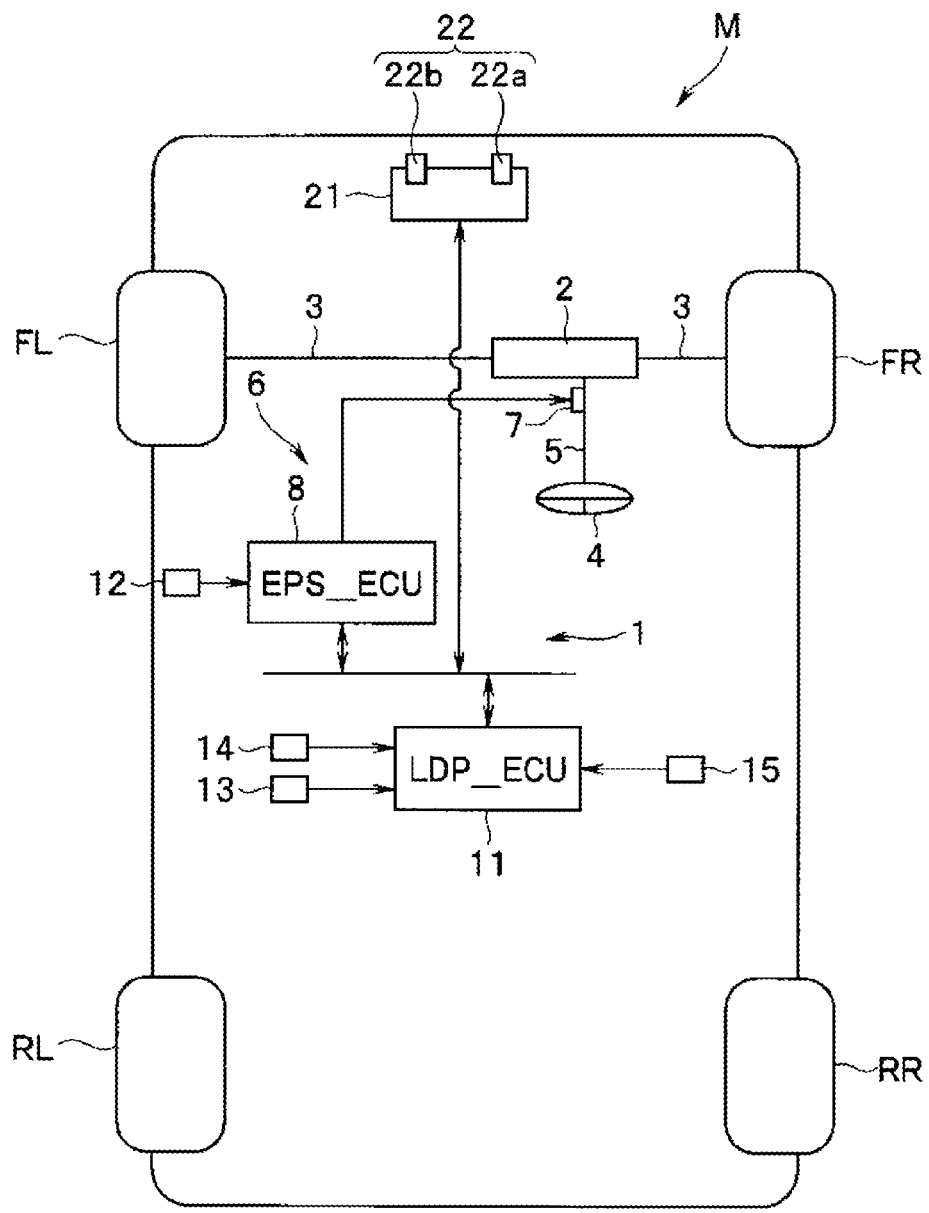
FIG. 1 is a schematic diagram of a vehicle that includes a lane departure control apparatus.

The lane departure control apparatus (hereinafter also simply referred to as "control apparatus") according to JP-A No. 2013-91494 also reduces the probability of lane departure by controlling lateral acceleration. To control lateral acceleration, the control apparatus stores therein a lane departure control pattern (hereinafter simply referred to as "control pattern"). The control pattern is a preset trapezoidal wave illustrated by a solid line in FIG. 7 and serves as a target for steering control. The control apparatus draws a locus of lane departure control (an estimated course) in accordance with the control pattern prepared for controlling lateral acceleration. The control apparatus then instructs an electric-power-steering (EPS) device of a steering angle corresponding to the locus, and activates an EPS motor accordingly. Thus, the traveling of the vehicle is controlled.

To generate a control pattern as a target for controlling lateral acceleration, the control apparatus detects the state of traveling of the vehicle through relevant sensors, and recognizes the shape of the road extending ahead of the vehicle through cameras or the like. Furthermore, with reference to a preset constant or the like, the control apparatus provides an initial value for controlling a steering angle. With reference to the initial value, a locus is generated in the dimension of lateral acceleration. If the locus is to depart from a lateral position that is preset as a target, lane departure control is started.

Parameters for lane departure control include initial lateral acceleration ao (see FIG. 7), vehicle speed, lateral position of the vehicle with respect to the lane line, and so forth. Initial lateral acceleration ao is regarded as lane-based lateral acceleration and is obtained as follows:

initial lateral acceleration ao=estimated lateral acceleration-actual lateral acceleration, where estimated lateral acceleration is calculated with reference to a lane curvature, which is recognized through imaging devices such as cameras; and actual lateral acceleration is calculated with reference to a curvature estimated from the steering angle.

In steering control executed with reference to the above parameters and in accordance with the control pattern, the lateral acceleration determined by the control pattern is integrated twice, whereby the amount of lateral travel of the vehicle is estimated. Then, whether the vehicle is to depart from the current lane is determined.

As described above, initial lateral acceleration (lane-based lateral acceleration) ao is obtained by subtracting actual lateral acceleration, which is calculated with reference to the curvature estimated from the steering angle, from estimated lateral acceleration, which is calculated with reference to the lane curvature. Imaging devices such as cameras and steering angle sensors that detect a steering angle involve nonuniformity. In the known art, nonuniformity in steering angle sensors, for example, are coped with by learning and correction through the detection of errors in the steering angle neutral point. Recognition errors in imaging devices such as cameras are coped with by autocalibration.

Figure 7:
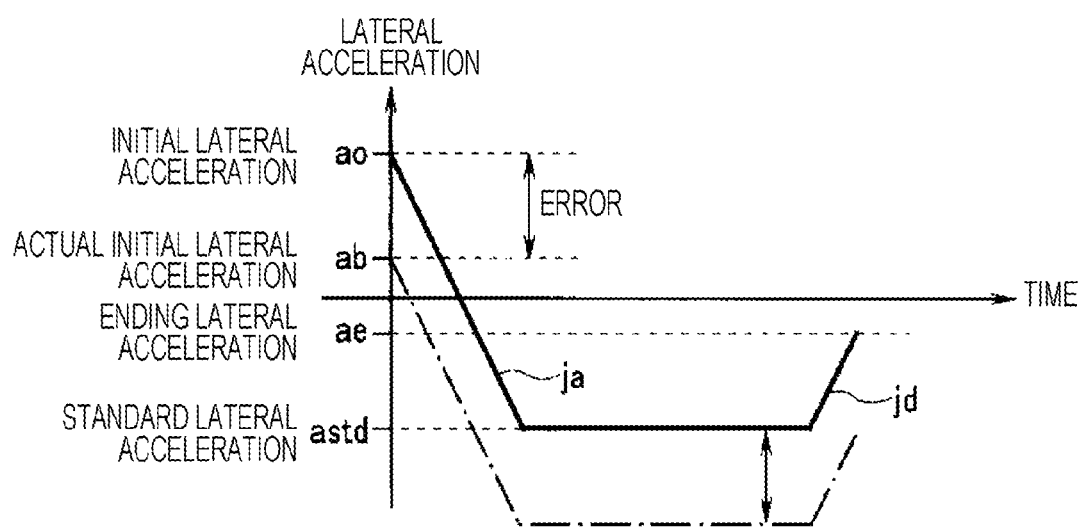
FIG. 7 is a time chart illustrating a lane departure control pattern, according to a known art, generated with reference to lateral acceleration.

In lane departure control, however, if the learning and correction control for the correction of errors in the steering angle neutral point detected by the steering angle sensor or the function of autocalibration of recognition errors in the imaging device is insufficient, or if the neutral learning of the steering angle is yet to converge or the calibration of recognition errors is in progress, the amount that is instructed of may be excessive, leading to oversteering. For example, as illustrated in FIG. 7, if an initial lateral acceleration ao that is higher than actual is detected because of nonuniformity in relevant sensors and devices, lane departure control is executed in accordance with a control pattern generated with reference to the high initial lateral acceleration ao. Consequently, steering intervention is executed in accordance with a control pattern generated with reference to an initial lateral acceleration (actual initial lateral acceleration) ab, which involves an error.

Figure 8:
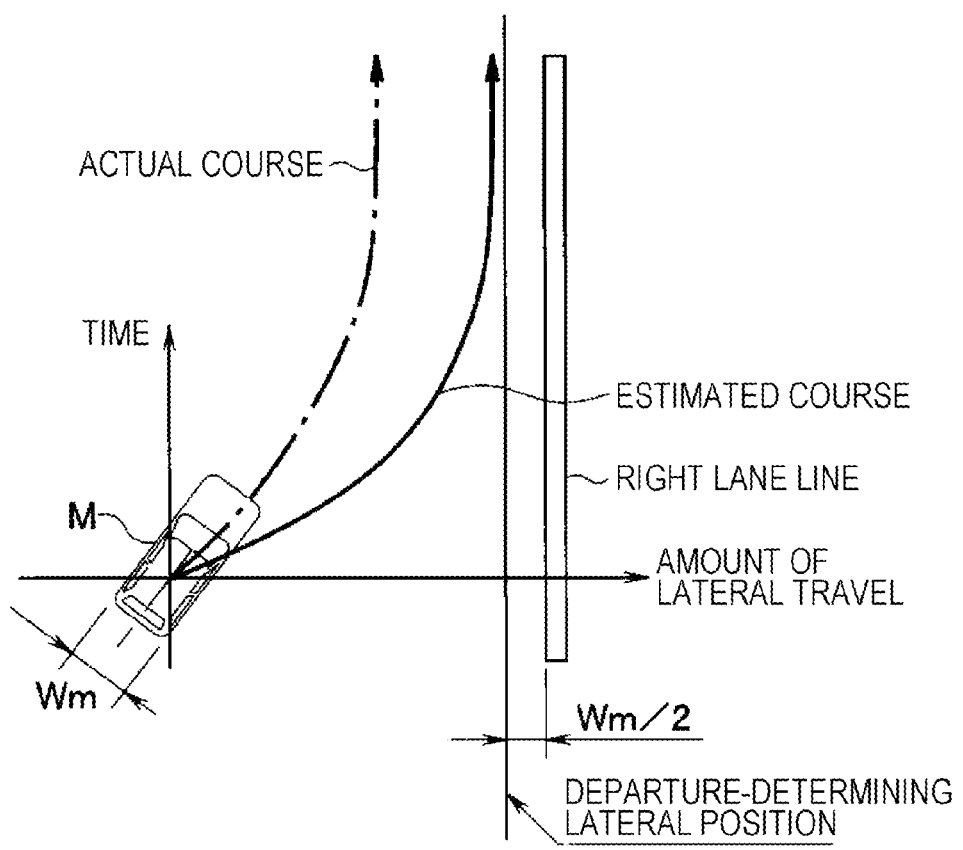
FIG. 8 illustrates an estimated course determined by known lane departure control and the actual course.

Accordingly, steering intervention is executed to follow a course (an actual course) illustrated by a one-dot chain line in FIG. 8, not an estimated course illustrated by a solid line in FIG. 8. That is, the timing of steering intervention is set earlier by the area of difference between the control pattern illustrated by the solid line in FIG. 7 and the control pattern illustrated by the one-dot chain line in FIG. 7. Therefore, the driver may feel odd with a sense of oversteering caused by an excessive steering intervention, despite the perception that he/she can avoid lane departure by his/her own steering.

To counteract the above situation, steering intervention may be withheld until learning control or autocalibration is complete. However, such a technique may reduce the opportunity of lane departure control.

It is desirable to provide a lane departure control apparatus intended for a vehicle. The apparatus is capable of executing steering intervention with an appropriate timing without reducing the opportunity of lane departure control even during learning control or autocalibration, and gives less oddness to the driver.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Referring to FIG. 1, a vehicle M includes left and right front wheels FL and FR and left and right rear wheels RL and RR. The left and right front wheels FL and FR are coupled to a steering mechanism 2 with respective tie rods 3. The steering mechanism 2 is a rack-and-pinion mechanism or the like. A steering shaft 5 is coupled to the steering mechanism 2. A steering wheel 4 is fixed to an end of the steering shaft 5. When a driver operates the steering wheel 4, the front wheels FL and FR are turned with the aid of the steering mechanism 2.

A lane departure control apparatus 1 includes an electric-power-steering (EPS) device 6 and a lane-departure-prevention control unit (LDP_ECU) 11. The EPS device 6 includes an EPS motor 7 and an EPS control unit (EPS_ECU) 8. The EPS_ECU 8 and the LDP_ECU 11 are electrically coupled to each other in such a manner as to be capable of bidirectional communication over an in-vehicle network employing a communication system such as a controller area network (CAN).

The EPS motor 7 of the EPS device 6 is coupled to the steering shaft 5 with a transmission mechanism (not illustrated) interposed therebetween. The EPS_ECU 8 controls a steering torque that the EPS motor 7 applies to the steering shaft 5.

A steering torque sensor 12 is attached to the steering shaft 5 and is electrically coupled to the EPS_ECU 8. The steering torque sensor 12 detects a steering torque that the driver applies to the steering wheel 4. The EPS_ECU 8 sets an assist torque that assists the steering torque that the driver applies to the steering wheel 4. The assist torque is set in accordance with the steering torque detected by the steering torque sensor 12 and other pieces of information such as vehicle speed. The vehicle speed is detected by a vehicle speed sensor 13 to be described below. The application of the assist torque to the steering shaft 5 reduces the load that the driver is to apply in steering.

In lane departure control, a steering-angle command signal corresponding to a steering torque that is set by the LDP_ECU 11 is transmitted to the EPS_ECU 8, and the EPS_ECU 8 causes the EPS motor 7 to generate a corresponding assist torque. The EPS_ECU 8 controls the vehicle M to be oriented parallel to the lane line with the use of the assist torque generated by the EPS motor 7, thereby reducing the probability of departure of the vehicle M from the current lane. Hereinafter, as a matter of convenience, the departure of the vehicle M from the current lane is simply referred to as "lane departure".

In addition to the EPS_ECU 8 and the LDP_ECU 11, various units (not illustrated) that control the state of traveling of the vehicle M are electrically coupled to one another in such a manner as to be capable of bidirectional communication over the in-vehicle network. The units include a drive-source control unit that controls drive sources such as an engine and electric motors, a transmission control unit, a brake control unit, and so forth.

The LDP_ECU 11 is electrically coupled to sensors that detect the behavior of the vehicle M. The sensors include the vehicle speed sensor 13 that detects vehicle speed, a yaw rate sensor 14 that detects the yaw rate and lateral acceleration of the vehicle, a steering angle sensor 15 that detects the steering angle from the rotation angle of the steering shaft 5, and so forth. In one embodiment, the steering angle sensor 15 may serve as a "steering angle detector".

Figure 2:
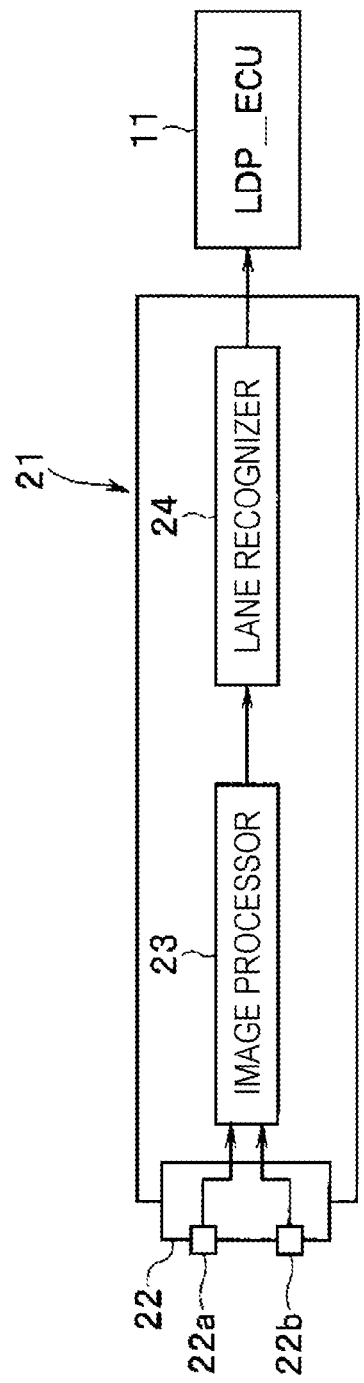
FIG. 2 is a functional block diagram of a camera unit.

A camera unit 21 includes an onboard camera 22. The onboard camera 22 is a stereo camera that includes a main camera 22a and a sub camera 22b. In one embodiment, the camera unit 21 may serve as a "lane information acquiring unit". As illustrated in FIG. 2, the camera unit 21 further includes an image processor 23 and a lane recognizer 24. The cameras 22a and 22b are disposed, for example, above a rearview mirror at the front in the vehicle M and near the windshield. The cameras 22a and 22b are at equal distances from the center of the vehicle M toward the left and right sides, respectively, in the widthwise direction. The cameras 22a and 22b are positioned to be level. The cameras 22a and 22b are each a color imaging device including a color charge-coupled device (CCD), a color complementary mental-oxide semiconductor (CMOS) device, or the like. The two color imaging devices capture respective three-dimensional color images of an environment ahead of the traveling vehicle M, including the lane that the vehicle M is currently traveling, the left and right lines that define the current lane, and so forth.

The image processor 23 converts the pair of images, which are analog, captured by the cameras 22a and 22b into a pair of digital images expressed with a predetermined luminance gradation, and generates reference image data from a signal received from the main camera 22a and comparative image data from a signal received from the sub camera 22b. With reference to the parallax between the reference image data and the comparative image data, the image processor 23 acquires distance data of one specific object in the two images (the distance from the vehicle M to the object).

The lane recognizer 24 includes a microcomputer. The lane recognizer 24 sets left and right lane lines of the current lane, which are recognized by a technique such as pattern matching, on the plane of a virtual road generated from the reference image data and the comparative image data received from the image processor 23. Subsequently, with reference to the distance data, the lane recognizer 24 detects the distance between the respective inner edges of the left and right lane lines (the lane width). Then, the lane recognizer 24 transmits the above information regarding the lane (hereinafter referred to as "lane information") to the LDP_ECU 11.

Figure 3:
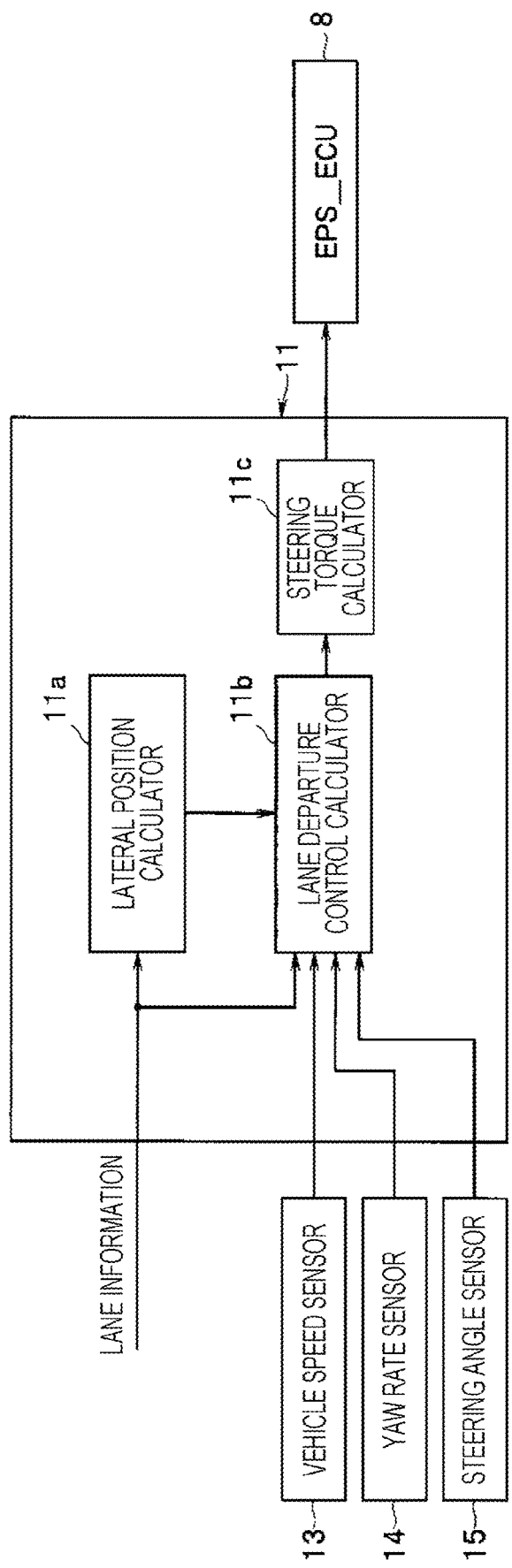
FIG. 3 is a functional block diagram of a lane-departure-prevention control unit.

As illustrated in FIG. 3, the LDP_ECU 11 includes a lateral position calculator 11a, a lane departure control calculator 11b, and a steering torque calculator 11c, each of which may serve as a function that executes lane departure control in one embodiment.

The lateral position calculator 11a calculates the lateral position of the vehicle M with reference to the lane information received from the lane recognizer 24. The lateral position is defined by the distances from the respective inner edges of the left and right lane lines to the center of the vehicle M in the direction of a vehicle width Wm. Alternatively, the lateral position may be calculated with reference to the midpoint between the inner edges of the left and right lane lines.

The lane departure control calculator 11b is electrically coupled on the input side thereof to the vehicle speed sensor 13, the yaw rate sensor 14, and the steering angle sensor 15. The lane departure control calculator 11b estimates the amount of lateral travel of the vehicle M by integrating a lane departure control pattern (hereinafter simply referred to as "control pattern") twice. The control pattern integrated here is a basic target for controlling lateral acceleration and is selected in lane departure control. The amount of lateral travel thus estimated is referred to when it is determined whether the vehicle M is to cross a departure-determining lateral position, which is set on the inner side with respect to each of the lane lines, that is, whether there is a possibility that the vehicle M may depart from the current lane.

Figure 5:
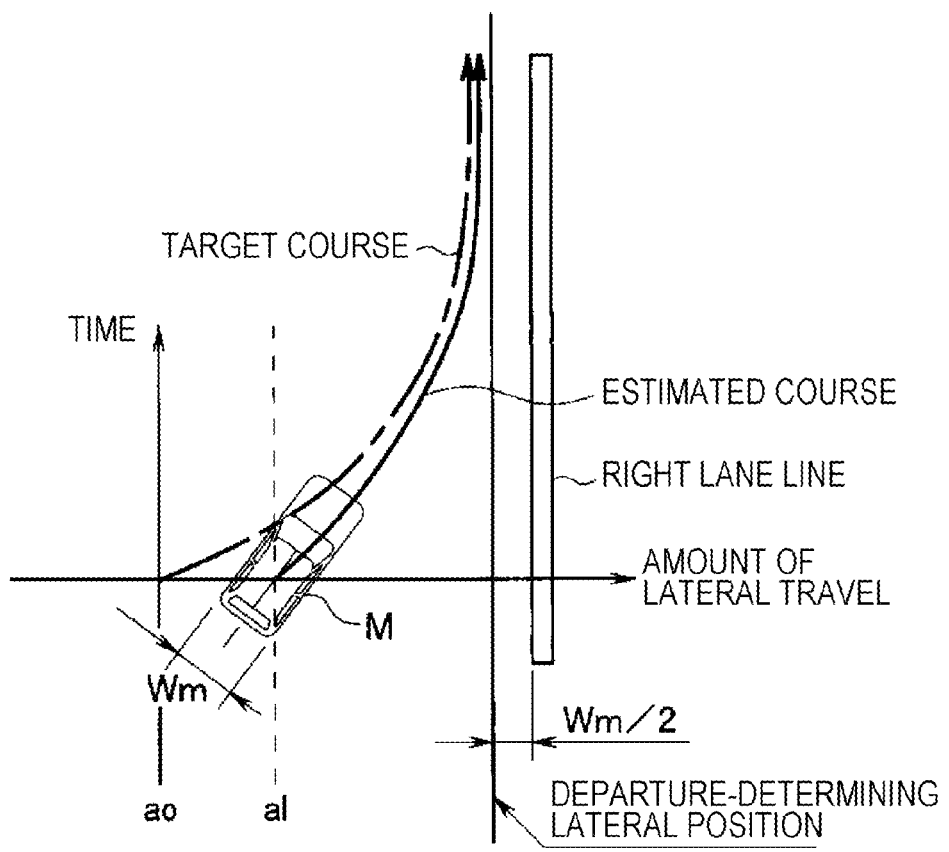
FIG. 5 illustrates an estimated course determined by lane departure control.

In the present embodiment, as illustrated in FIG. 5, the departure-determining lateral position is set to a position on the inner side with respect to the inner edge of the lane line by ½ of the vehicle width Wm. The lateral position of the vehicle M with respect to the departure-determining lateral position is defined with reference to the center of the vehicle M in the direction of the vehicle width Wm. Therefore, if the traveling course of the vehicle M crosses the departure-determining lateral position, the body of the vehicle M crosses the lane line correspondingly.

The lane departure control calculator 11b transmits to the steering torque calculator 11c a steering angle signal corresponding to the amount of lateral travel (estimated amount of lateral travel) calculated in accordance with the control pattern, which is a trapezoidal wave serving as a target of control.

The steering torque calculator 11c sets a steering torque (an amount of control) corresponding to the steering angle represented by the steering angle signal received from the lane departure control calculator 11b, and transmits the steering torque to the EPS_ECU 8. The EPS_ECU 8 activates the EPS motor 7 with reference to the steering torque received from the LDP_ECU 11 and thus generates a corresponding assist torque.

In this process, the steering torque calculator 11c causes the vehicle M to travel along an estimated course (see FIG. 5) that is set in accordance with the steering angle signal and the vehicle speed, whereby the probability that the vehicle M may cross the lane line is reduced.

Figure 4:
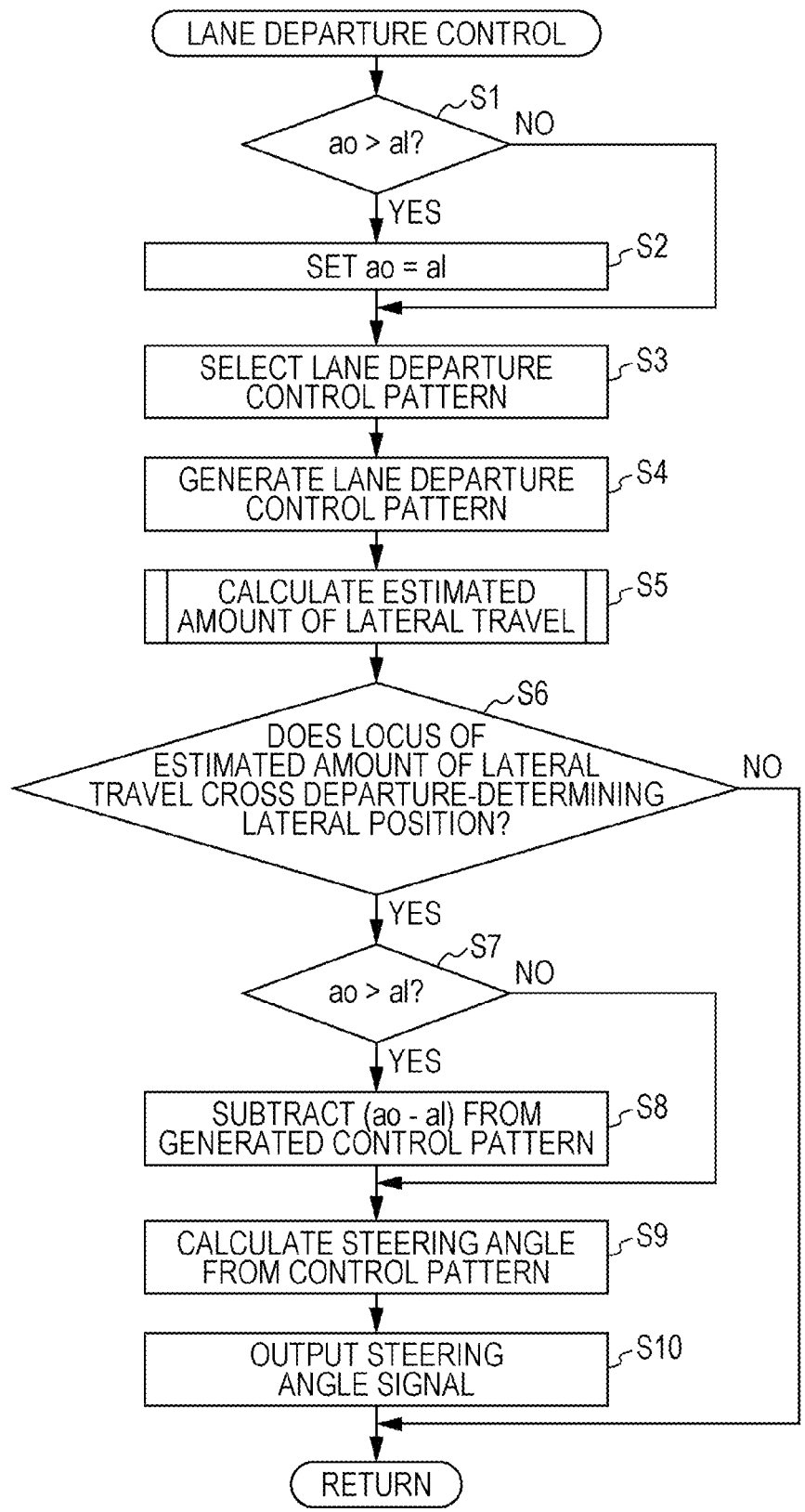
FIG. 4 is a flowchart of a lane departure control routine.
Figure 6A:
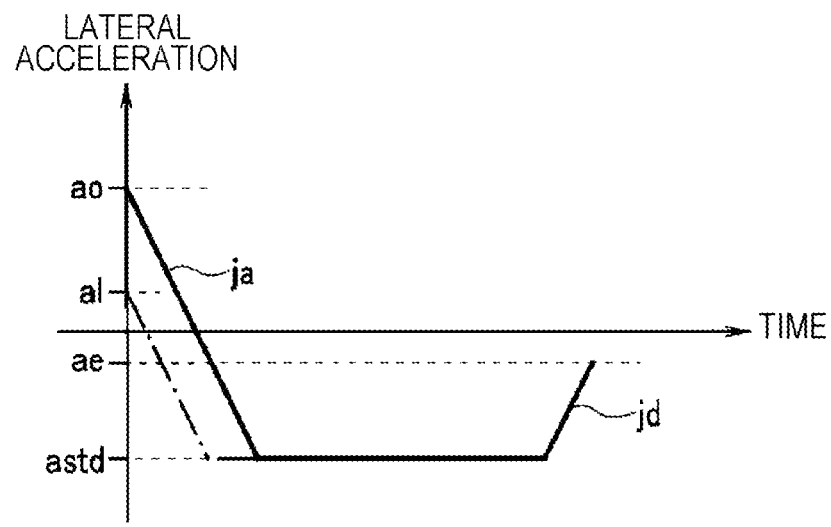
FIG. 6A is a time chart illustrating a lane departure control pattern generated with reference to lateral acceleration.

The above lane departure control by the lane departure control calculator 1ib proceeds in accordance with, for example, a lane departure control routine illustrated in FIG. 4. The LDP_ECU 11 stores therein a plurality of control patterns to be used in setting a course for reducing the probability of lane departure. FIG. 6A illustrates an exemplary control pattern by a one-dot chain line. Referring to FIG. 6A, ao denotes initial lateral acceleration regarded as lane-based lateral acceleration. Lane-based lateral acceleration is calculated as a difference between estimated lateral acceleration [m/s$^2$] and actual lateral acceleration [m/s$^2$]. Estimated lateral acceleration [m/s$^2$] is to occur if the vehicle M travels along a lane having a lane curvature 1/Rcam [1/m] that the vehicle M is to follow. Actual lateral acceleration [m/s$^2$] occurs in the actual traveling of the vehicle M.

In the present embodiment, the lane curvature 1/Rcam of the current lane in which the vehicle M is traveling is acquired from the lane recognizer 24. Then, the lane curvature 1/Rcam is multiplied by the square of a vehicle speed Vs [m/sec] detected by the vehicle speed sensor 13, whereby an estimated lateral acceleration is obtained. On the other hand, the actual lateral acceleration is obtained as follows. A curvature is obtained from a steering angle Est detected by the steering angle sensor 15 and with reference to a conversion map, and the curvature is multiplied by the square of the vehicle speed Vs [m/sec].

Referring to FIG. 6A, the control pattern is set with reference to an initial-lateral-acceleration limit al. The initial-lateral-acceleration limit al is the upper limit of a margin of error attributed to nonuniformity in sensors and devices that are used in the determination of lane departure. The initial-lateral-acceleration limit al is set in advance in accordance with the characteristics of such sensors and devices.

In the present embodiment, the initial-lateral-acceleration limit al is set in accordance with the characteristics of the steering angle sensor 15 and the onboard camera 22. The lane departure control calculator 11b includes a storage that stores the initial-lateral-acceleration limit al.

The control pattern involves standard lateral acceleration astd and ending lateral acceleration ae. Standard lateral acceleration astd causes the vehicle M to turn at a constant lateral acceleration (lateral acceleration≠0). Ending lateral acceleration ae is the lateral acceleration at the end of lane departure control. The control pattern further involves forward steering jerk (increasing acceleration) ja and backward steering jerk jd. Forward steering jerk ja connects the initial-lateral-acceleration limit al to the standard lateral acceleration astd. Backward steering jerk jd connects the standard lateral acceleration astd to the ending lateral acceleration ae.

First, in Step S1 of this routine, the initial lateral acceleration ao and the initial-lateral-acceleration limit al that are set for generating a control pattern are compared. If ao>al, the routine proceeds to Step S2. If ao al, the routine proceeds to Step S3. As illustrated in FIG. 6A, if the initial lateral acceleration ao is over the initial-lateral-acceleration limit al (ao>al), it is assumed that there is a steady-state deviation attributed to nonuniformity in the sensors and devices. If ao≤al, the sensors and devices are determined to be normal.

In Step S2, the initial lateral acceleration ao is set to be equal to the initial-lateral-acceleration limit al. Then, the routine proceeds to Step S3. In Step S3, a control pattern that reduces the probability of lane departure is selected from a plurality of control patterns.

Subsequently, in Step S4, a target course based on the control pattern selected in Step S3 is generated with reference to the initial-lateral-acceleration limit al, as illustrated by a one-dot chain line in FIG. 6A, whereby a new control pattern is generated.

Subsequently, in Step S5, in accordance with the new control pattern generated in Step S4, an estimated amount of lateral travel of the vehicle M is calculated for each of calculation periods. The final estimated amount of lateral travel is obtained by Expression (1) below:

estimated amount of lateral travel=amount of lateral travel with forward steering+amount of lateral travel at standard lateral acceleration+amount of lateral travel with backward steering (1)

The amount of lateral travel with forward steering refers to the amount of lateral travel that is made when the steering wheel is turned forward in accordance with the forward steering jerk ja in such a direction that the vehicle M keeps the current lane. The amount of lateral travel at standard lateral acceleration refers to the amount of lateral travel that is made when the steering wheel is kept still in accordance with the standard lateral acceleration astd. The amount of lateral travel with backward steering refers to the amount of lateral travel that is made when the steering wheel is turned backward in accordance with the backward steering jerk jd until the vehicle M is oriented parallel to the lane line. Therefore, the lateral position of the vehicle M is closest to the lane line when the vehicle M has undergone lateral travel with backward steering.

Subsequently, in Step S6, if a locus defined by the estimated amount of lateral travel crosses the departure-determining lateral position, it is determined that the intervention with lane departure control is to be executed. Then, the routine proceeds to Step S7. On the other hand, if the locus defined by the estimated amount of lateral travel does not cross the departure-determining lateral position and runs on the inner side with respect to the departure-determining lateral position, the routine is ended without the intervention with lane departure control.

In Step S7, the initial lateral acceleration ao and the initial-lateral-acceleration limit al are compared again. If ao>al, the routine proceeds to Step S8. If ao al, the routine proceeds to Step S9.

In Step S8, the control pattern is corrected in accordance with the excess of the initial lateral acceleration ao over the initial-lateral-acceleration limit al (ao-al). For example, the excess of the initial lateral acceleration ao over the initial-lateral-acceleration limit al (ao-al) is generally subtracted from the lateral acceleration of the control pattern, whereby a new control pattern is generated. Therefore, in one embodiment of the disclosure, the lane departure control calculator 1ib that executes the process of Step S8 may serve as a "control pattern generator".

Figure 6B:
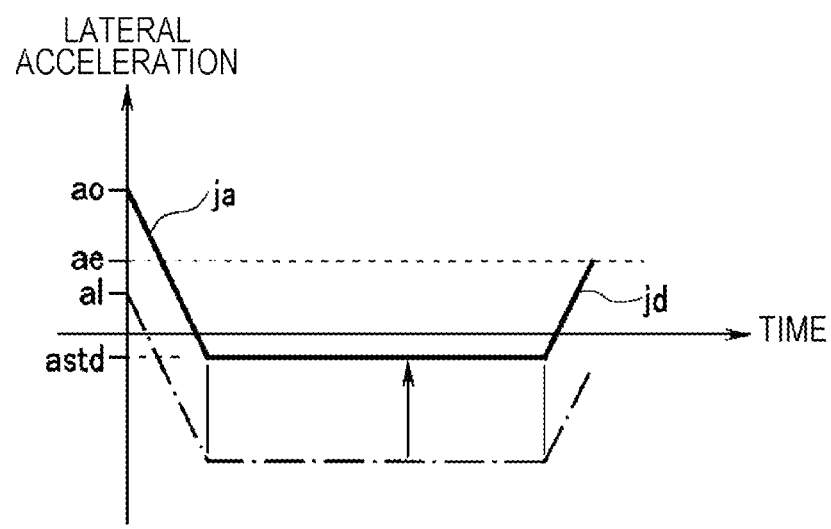
FIG. 6B is a time chart illustrating a lane departure control pattern obtained after the correction of errors attributed to nonuniformity in relevant sensors and devices.

As a result of Step S8, as illustrated by a solid line in FIG. 6B, the entirety of the control pattern is shifted toward the positive side by the excess (ao-al). The target course obtained under the above lane departure control but yet to be corrected starts from a point earlier than actual as illustrated by a one-dot chain line in FIG. 5. However, since errors in the sensors and devices are corrected, lane departure control is actually executed such that the lateral position is controlled in accordance with the estimated course illustrated by a solid line in FIG. 5.

When the routine proceeds from Step S7 or Step S8 to Step S9, a steering angle signal corresponding to the control pattern is calculated. Then, in Step S10, the steering angle signal is transmitted to the steering torque calculator 11d. Thus, the routine is ended.

As described above, the lane departure control calculator lib according to the present embodiment sets the initial-lateral-acceleration limit al and calculates the initial lateral acceleration ao as the difference between the estimated lateral acceleration at which the vehicle M is to travel and the actual lateral acceleration at which the vehicle M actually travels. Subsequently, the lane departure control calculator lib compares the initial-lateral-acceleration limit al and the initial lateral acceleration ao and determines whether the initial lateral acceleration ao is over the initial-lateral-acceleration limit al.

If the initial lateral acceleration ao is over the initial-lateral-acceleration limit al, the excess (ao-al) is assumed to be a steady-state deviation attributed to nonuniformity in the sensors and devices. Accordingly, a control pattern resulting from the subtraction of the excess (ao-al) is generated. Therefore, in one embodiment of the disclosure, the lane departure control calculator 11b may serve as an "estimated-lateral-acceleration calculator", an "actual-lateral-acceleration calculator", and a "lane-based-lateral-acceleration calculator".

The control pattern is set with reference to the initial lateral acceleration ao. Therefore, for example, if the neutral learning of the steering angle detected by the steering angle sensor 15 is yet to be converged, a relevant component is subtracted from the control pattern. Thus, the probability of oversteering is reduced. If the neutral learning of the steering angle detected by the steering angle sensor 15 has been converged and the initial lateral acceleration ao is smaller than or equal to the initial-lateral-acceleration limit al, lane departure control based on the normal control pattern is executed. This also applies to a case where autocalibration of recognition errors in the imaging devices is employed.

Consequently, lane departure control is executed with less influence of the state of convergence of the neutral learning of the steering angle detected by the steering angle sensor 15 or the state of autocalibration of the imaging devices. Therefore, the opportunity of lane departure control is not reduced and may be increased relatively, even during learning control or autocalibration. Furthermore, steering intervention is executed with an appropriate timing. Therefore, good steering assist and lane departure control are achieved while less oddness is given to the driver.

The disclosure is not limited to the above embodiment. For example, the yaw rate sensor 14 may be replaced with a lateral acceleration sensor.

The LDP_ECU 11 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the LDP_ECU 11 including the lateral position calculator 11a, the lane departure control calculator 11b, and the steering torque calculator 11c. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

According to the above aspects of the disclosure, if the lane-based lateral acceleration calculated by the lane-based-lateral-acceleration calculator is over the limit, a new lane departure control pattern is generated by correcting the lane-based lateral acceleration in accordance with the excess over the limit. Therefore, even if detected values involve errors attributed to nonuniformity in the lane information acquiring unit and the steering angle detector, steering intervention by lane departure control is executed with an appropriate timing.

The invention claimed is:

1. A lane departure control apparatus to be applied to a vehicle, the lane departure control apparatus comprising:
   a lane departure control calculator comprising a processor and one or more memories storing instructions for causing the processor to determine whether the vehicle is to depart from a current lane in accordance with a preset lane departure control pattern;
   a lane information acquiring unit comprising an onboard camera being configured to acquire lane information on the current lane; and
   a steering angle detector comprising a steering angle sensor being configured to detect a steering angle of the vehicle,
   wherein the processor of the lane departure control calculator is further caused to:
      calculate a lane curvature with reference to the lane information acquired by the lane information acquiring unit and to calculate estimated lateral acceleration with reference to the lane curvature, the estimated lateral acceleration being to act on the vehicle,
      calculate actual lateral acceleration of the vehicle with reference to the steering angle detected by the steering angle detector,
      calculate lane-based lateral acceleration with reference to the estimated lateral acceleration and the actual lateral acceleration,
      store a limit of the lane-based lateral acceleration into a storage,
      compare the calculated lane-based lateral acceleration and the limit stored in the storage and to generate a new lane departure control pattern in response to the lane-based lateral acceleration being over the limit by correcting the lane-based lateral acceleration in accordance with an excess of the lane-based lateral acceleration over the limit,
   generate a steering angle signal in accordance with the new lane departure control pattern, and
   output the steering angle signal to control the vehicle to travel in accordance with the new lane departure control pattern.

2. The lane departure control apparatus according to claim 1, wherein the processor of the lane departure control calculator is further caused to generate the new lane departure control pattern by subtracting the excess over the limit from the lane-based lateral acceleration.

3. The lane departure control apparatus according to claim 2, wherein the the processor of the lane departure control calculator is further caused to set a control start position of the new lane departure control pattern in accordance with the lane-based lateral acceleration.

4. The lane departure control apparatus according to claim 3, wherein the limit stored in the storage is an upper limit of a margin of error attributed to nonuniformity in sensors and devices that are to be used when the processor determines whether the vehicle is to depart from the current lane.

5. The lane departure control apparatus according to claim 2, wherein the limit stored in the storage is an upper limit of a margin of error attributed to nonuniformity in sensors and devices that are to be used when the processor determines whether the vehicle is to depart from the current lane.

6. The lane departure control apparatus according to claim 1, wherein the the processor of the lane departure control calculator is further caused to set a control start position of the new lane departure control pattern in accordance with the lane-based lateral acceleration.

7. The lane departure control apparatus according to claim 6, wherein the limit stored in the storage is an upper limit of a margin of error attributed to nonuniformity in sensors and devices that are to be used when the processor determines whether the vehicle is to depart from the current lane.

8. The lane departure control apparatus according to claim 1, wherein the limit stored in the storage is an upper limit of a margin of error attributed to nonuniformity in sensors and devices that are to be used when the processor determines whether the vehicle is to depart from the current lane.

9. A lane departure control apparatus intended to be applied to a vehicle, the lane departure control apparatus comprising:

circuitry configured to determine whether the vehicle is to depart from a current lane in accordance with a preset lane departure control pattern;

a lane information acquiring unit configured to acquire lane information on the current lane via an onboard camera; and a steering angle detector configured to detect a steering angle of the vehicle via a steering angle sensor, wherein the circuitry is configured to:
calculate a lane curvature with reference to the lane information acquired by the lane information acquiring unit and calculate estimated lateral acceleration with reference to the lane curvature, the estimated lateral acceleration being to act on the vehicle, calculate actual lateral acceleration of the vehicle with reference to the steering angle detected by the steering angle detector, calculate lane-based lateral acceleration with reference to the estimated lateral acceleration and the actual lateral acceleration, store a limit of the lane-based lateral acceleration, and compare the lane-based lateral acceleration and the limit and generate a new lane departure control pattern in response to the lane-based lateral acceleration being over the limit, the new lane departure control pattern being generated by correcting the lane-based lateral acceleration in accordance with an excess of the lane-based lateral acceleration over the limit, generate a steering angle signal in accordance with the new lane departure control pattern; and output the steering angle signal to control the vehicle to travel in accordance with the new lane departure control pattern.

\* \* \* \* \*